United States Patent
Faus et al.

(10) Patent No.: US 8,924,920 B2
(45) Date of Patent: Dec. 30, 2014

(54) PROVIDING A SOFTWARE APPLIANCE BASED ON A ROLE

(75) Inventors: Norman Lee Faus, Raleigh, NC (US); David P. Huff, Cary, NC (US); Bryan M. Kearney, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1248 days.

(21) Appl. No.: 12/040,810

(22) Filed: Feb. 29, 2008

(65) Prior Publication Data
US 2009/0222808 A1  Sep. 3, 2009

(51) Int. Cl.
G06F 9/44    (2006.01)
G06F 9/445   (2006.01)

(52) U.S. Cl.
CPC ........................... *G06F 8/61* (2013.01)
USPC ........................................... 717/104

(58) Field of Classification Search
CPC ....... G06F 12/00; G06F 9/44505; G06F 8/10; G06F 8/20; G06F 8/24; G06F 8/34; G06Q 10/06
See application file for complete search history.

(56) References Cited

U.S. PATENT DOCUMENTS

| | | | |
|---|---|---|---|
| 6,367,077 B1 | 4/2002 | Brodersen et al. | |
| 6,578,199 B1 | 6/2003 | Tsou et al. | |
| 7,461,095 B2 | 12/2008 | Cohen et al. | |
| 7,624,394 B1 | 11/2009 | Christopher, Jr. | |
| 7,996,648 B2 * | 8/2011 | England et al. | 711/203 |
| 2002/0086688 A1 | 7/2002 | Kang | |
| 2002/0129352 A1 | 9/2002 | Brodersen et al. | |
| 2003/0220835 A1 * | 11/2003 | Barnes, Jr. | 705/14 |
| 2005/0044541 A1 | 2/2005 | Parthasarathy et al. | |
| 2006/0146991 A1 * | 7/2006 | Thompson et al. | 379/67.1 |
| 2006/0218544 A1 * | 9/2006 | Chakraborty et al. | 717/168 |
| 2006/0218547 A1 * | 9/2006 | Purkeypile et al. | 717/173 |
| 2007/0074201 A1 | 3/2007 | Lee | |
| 2007/0078988 A1 * | 4/2007 | Miloushev et al. | 709/227 |
| 2007/0169079 A1 | 7/2007 | Keller et al. | |
| 2007/0245332 A1 | 10/2007 | Tal et al. | |
| 2008/0022271 A1 | 1/2008 | D'Angelo et al. | |
| 2008/0034364 A1 * | 2/2008 | Lam et al. | 718/1 |
| 2008/0052384 A1 | 2/2008 | Marl et al. | |
| 2008/0086728 A1 * | 4/2008 | Lam et al. | 718/1 |
| 2008/0178144 A1 * | 7/2008 | Bazigos et al. | 717/101 |
| 2008/0215796 A1 * | 9/2008 | Lam et al. | 711/100 |
| 2009/0064086 A1 | 3/2009 | Faus | |
| 2009/0083734 A1 * | 3/2009 | Hotra | 718/1 |
| 2009/0144718 A1 | 6/2009 | Boggs | |
| 2009/0210869 A1 * | 8/2009 | Gebhart et al. | 717/174 |
| 2009/0217244 A1 * | 8/2009 | Bozak et al. | 717/124 |
| 2009/0217255 A1 * | 8/2009 | Troan | 717/168 |
| 2009/0217263 A1 * | 8/2009 | Gebhart et al. | 718/1 |
| 2009/0222805 A1 | 9/2009 | Faus | |
| 2009/0222806 A1 | 9/2009 | Faus | |
| 2009/0249488 A1 | 10/2009 | Robinson et al. | |

(Continued)

*Primary Examiner* — Li B Zhen
*Assistant Examiner* — Arshia S Kia
(74) *Attorney, Agent, or Firm* — Lowenstein Sandler LLP

(57) ABSTRACT

An appliance module can provide software appliances to users. The appliance module can provide the software appliances in view of a role desired by the users. The role can be the desired functionality to be provided by the software appliance. To achieve this, the appliance module can receive a request for a software appliance. In view of the request, the appliance module can determine a software appliance that includes one or more applications that meets the role set forth in the request and just enough operating system to support the one or more applications. The appliance module can provide the software appliance to the requesting user.

21 Claims, 8 Drawing Sheets

(56) References Cited

U.S. PATENT DOCUMENTS

2009/0300164 A1 12/2009 Boggs
2009/0300584 A1 12/2009 Faus
2009/0300593 A1 12/2009 Faus
2009/0300601 A1 12/2009 Faus \* cited by examiner

PROVIDING A SOFTWARE APPLIANCE BASED ON A ROLE

FIELD

This invention relates generally to products and services, more particularly, to systems and methods for software appliance related services and products.

DESCRIPTION OF THE RELATED ART

The proliferation of the World Wide Web through the Internet has made a wealth of products and services available to users to purchase and use nearly instantaneously. Vendors, service providers, manufacturers, third party distributors, etc., may have websites for the users to review and purchase their respective products and/or services and to obtain technical support for the product and/or services.

Although most computers come pre-configured with some computer software, most users must install and/or configure additional computer software on their computer to tailor their computer for their particular needs. Such computer software installation and/or configuration can be as easy as a one step activation of an installation program. Because of is complex nature, the post install configuration can not be automated without some level of user interaction or knowledge of the pre-existing system. However, in order to make software truly operational, more complex computer applications require a user to perform post-installation configuration of the software.

Additionally, most software is designed to meet the needs of a wide range users. As such, the software is designed to include features and components to addresses all requirements. For example, operating systems (OS) are designed to be universally compatible with a multitude of applications and compatible with different computing system. Unfortunately, the universal nature of the software has caused the size and cost of the software to increase dramatically. For example, OS may be many gigabytes in size.

However, most users do not require all the features and components offered by typical software. As such, the user wastes space and resources on the features and components not utilized for their particular need. Thus, there is a need in the art for methods and system that provide software that is specifically tailored to users.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information and service portals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

According to embodiments, an appliance module can be configured to provide software appliances to users. The appliance module can be configured to provide the software appliances based on a role desired by the users. The role can be the desired functionality to be provided by the software appliance. To achieve this, the appliance module can be configured to receive a request for a software appliance. The request can include the role for the software appliance. Based on the request, the appliance module can be configured to determine a software appliance that includes one or more applications that meets the role set forth in the request and just enough operating system to support the selected one or more applications.

The appliance module can be configured to provide the software appliance to the requesting user. The appliance module can be configured to delivery the software appliance via physical media or transmit the software appliance to the user via a network. Likewise, the appliance module can be configured to provide the user with a link to the software appliance to allow the user to download the software appliance.

By providing the user with a software appliance that meets a specific need, the user is not required to purchase and install unnecessary software. Accordingly, the user can implement the software appliance by utilizing less space and at reduced cost.

Figure 1:
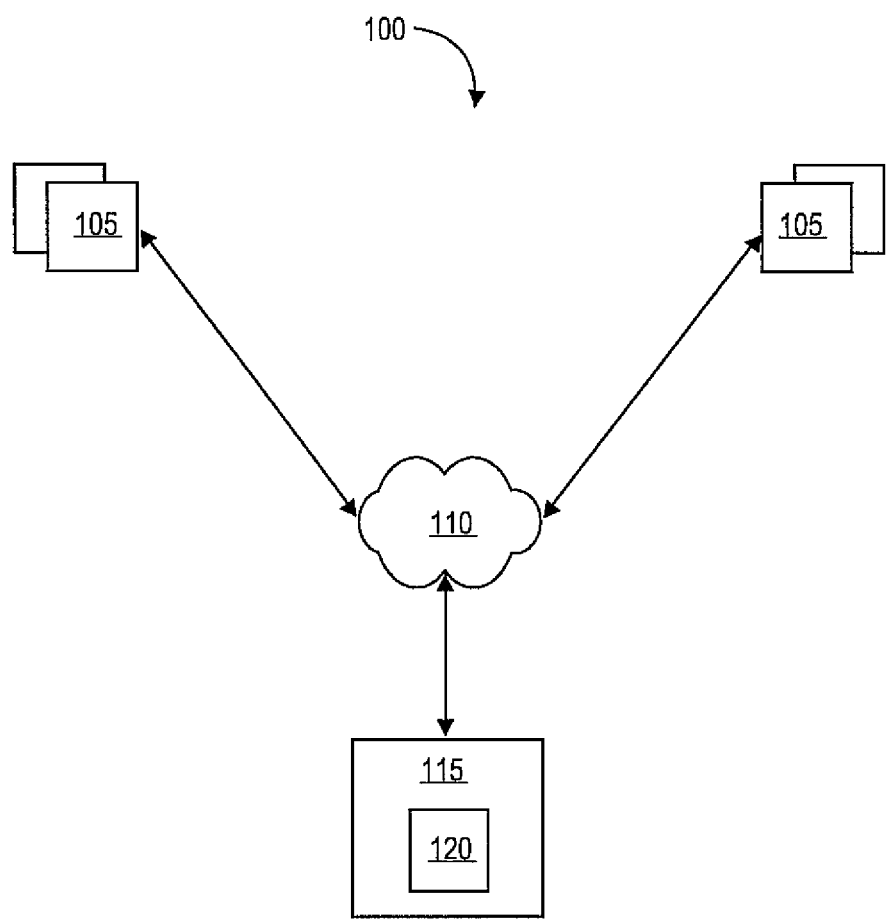
FIG. 1 depicts an exemplary system in accordance with an embodiment.

FIG. 1 illustrates an exemplary system 100 in accordance with an embodiment. It should be readily apparent to those of ordinary skill in the art that system 100 depicted in FIG. 1 represents a generalized schematic illustration and that other components may be added or existing components may be removed or modified. Moreover, system 100 may be implemented using software components, hardware components, or combinations thereof.

As shown in FIG. 1, system 100 includes users 105, a network 110 and a web service portal 115. Users 105 can be private individuals, employees of private business or public entities or other persons interested in accessing web service portal 115. Users 105 can access web service portal 115 using personal computers, personal mobile devices, workstations or other networked computing platforms.

Network 110 can be a combination of wide area and local area networks such as the Internet. Network 110 can be configured to provide a communication channel between users 105 and web service portal 115. Network 110 can implement a variety of network protocols to provide the communication channel such as Internet Protocol ("IP") Vx, ATM, SONET, or other similar network protocols.

Web service portal 115 can be configured to provide products and services to user 105 as well as provisioning, installation services, updates to software and hardware products and technical support. Web service portal 115 can, among other functions, provide a list of products such as software applications, software appliances and/or hardware devices as well as services such as installation, configuration, maintenance, etc., for users 105 to purchase. As a non-limiting example, web service portal 115 can also provide information for users to research, compare and purchase software, hardware and consulting services in support of those software and/or hardware purchases. Web service portal 115 can also be configured to provide support services, for free or by subscription, to those same software, service, and/or hardware purchases.

In accordance with various embodiments, web service portal 115 can be configured to provide an appliance support (AS) module 120 to provide software appliances to user 105 and support the software appliances.

Figure 2:
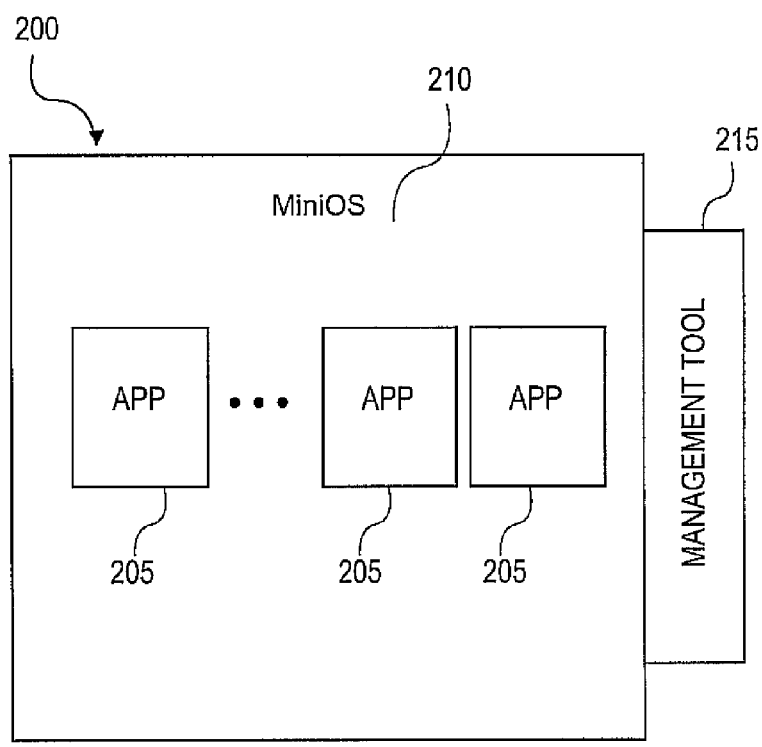
FIG. 2 illustrates an exemplary software appliance in accordance with various embodiments.

FIG. 2 shows an exemplary software appliance according to various embodiments. As shown, a software appliance 200 can comprise one or more applications 205 combined with a "minimum amount of an operating system" (MiniOS) 210 to allow application(s) 205 to run on a computing platform or in a virtual machine executing on a computing platform. MiniOS 210 can comprise a subset of the components of a complete OS that contains enough resources to support the application(s) 205 intended to be encapsulated with MiniOS 210. Software appliance 200 occupies less space than regular or self-standing applications and independent OSes, because MiniOS 210 includes a set of reduced features and components required to provide an application space for application(s) 205 of the software appliance.

Software appliance 200 comprises a binary image of application(s) 205 and selected MiniOS 210 contained in software appliance 200. The image contains the bits of software appliance 200 as installed on a computing platform. As such, to place software appliance 200 on computing platform, software appliance 200 only needs to be physically copied to the memory or storage of the computing platform and, then, configured to function with the computing platform or virtual machine running on the computing platform. In embodiments, software appliance 200 can be distributed via media such as CD-ROM, DVD-ROM, high-definition format discs, or flash media, transmitted via a network, or can be downloaded from a Web site or other location.

Software appliance 200 can streamline the distribution of applications by minimizing the tasks typically associated with installation, configuration and maintenance. Software appliance 200 is completely functional as a self-contained unit, and requires no separately installed or configured OS to function. Inside software appliance 200, application(s) 205 and MiniOS 210 are pre-configured to function and operate together. As such, once software appliance 200 is placed on a computing platform or virtual machine, software appliance 200 only requires a configuration of the software appliance to the computing platform or virtual machine.

Additionally, software appliance 200 can be pre-configured for a specific client or computing platform on which it will be placed. Specifically, during creation of software appliance 200, MiniOS 210 and application(s) 205 of software appliance 200 can be pre-configured with the settings and parameters of the client or computing platform on which it will be placed. For example, if software appliance 200 includes a server OS and Email server application, the server OS and Email server application can be pre-configured to operate with the network settings of the computing platform it be placed and the network it will serve. Accordingly, software appliance 200 needs only to be placed on the target client or computing platform without additional configuration. In embodiments, software appliance 200 can be installed to a variety of clients, servers or other target devices, such as network servers, personal computers, network-enabled cellular telephones, personal digital assistants, media players, and others, such as illustrated in FIG. 1 above.

Software appliance 200 can also be updated and upgraded in by several different processes. Since software appliance 200 is a binary image, an updated or upgraded software appliance can be created as a completely new binary image of the entire software appliance incorporating the updates or upgrades. To update or upgrade software appliance 200 using a complete image, the updated or upgraded appliance can simply replace software appliance 200. Alternatively, software appliance 200 can be updated or upgraded incrementally. For each update or upgrade, the bits of the binary image required to update or upgrade software appliance 200 can be determined. To update or upgrade software appliance 200, the update bits can be added to software appliance 200 on a binary-difference basis.

Software appliance 200 can also be configured to communicate with a management tool 215. Management tool 215 can for example be utilized in order to start/stop, configure, repair, and update software appliance 200. Management tool 215 can manage the entire software appliance 200, including both application(s) 205 and MiniOS 210. Likewise, management tool 215 can include multiple tools, for instance to manage application(s) 205 and MiniOS 210, separately.

Management tool 215 can be embedded in software appliance 200 itself. In such implementations, software appliance 200 can be managed from the particular computing platform on which it is placed. Additionally, management tool 215 can be separate from software appliance 200. For example, in a networked environment management tool 215 can be installed on a network server that communicates with one or more clients on the network in which software appliance 200 is installed. In networked implementations, management tool 215 can be configured to manage a set of multiple software appliances 200 across all clients from a single platform.

Returning to FIG. 1, according to various embodiments, AS module 120 can be configured to provide software appliances to user 105. AS module 120 can be configured to provide the software appliances based on a role desired by user 105. The role can be the desired functionality to be provided by the software appliance. To achieve this, AS module 120 can be configured to receive a request for a software appliance via web-service portal 115. The request can include the role for the software appliance. Based on the request, AS module 120 can be configured to determine a software appliance that includes one or more applications that meets the role set forth in the request and just enough operating system to support the one or more applications.

AS module 120 can be configured to provide the software appliance to the requesting user 105. AS module 120 can be configured to delivery the software appliance via physical media or transmit the software appliance to user 105 via network 100. Likewise, AS module 120 can be configured to provide user 105 with a link to the software appliance to allow the user to download the software appliance.

Figure 3:
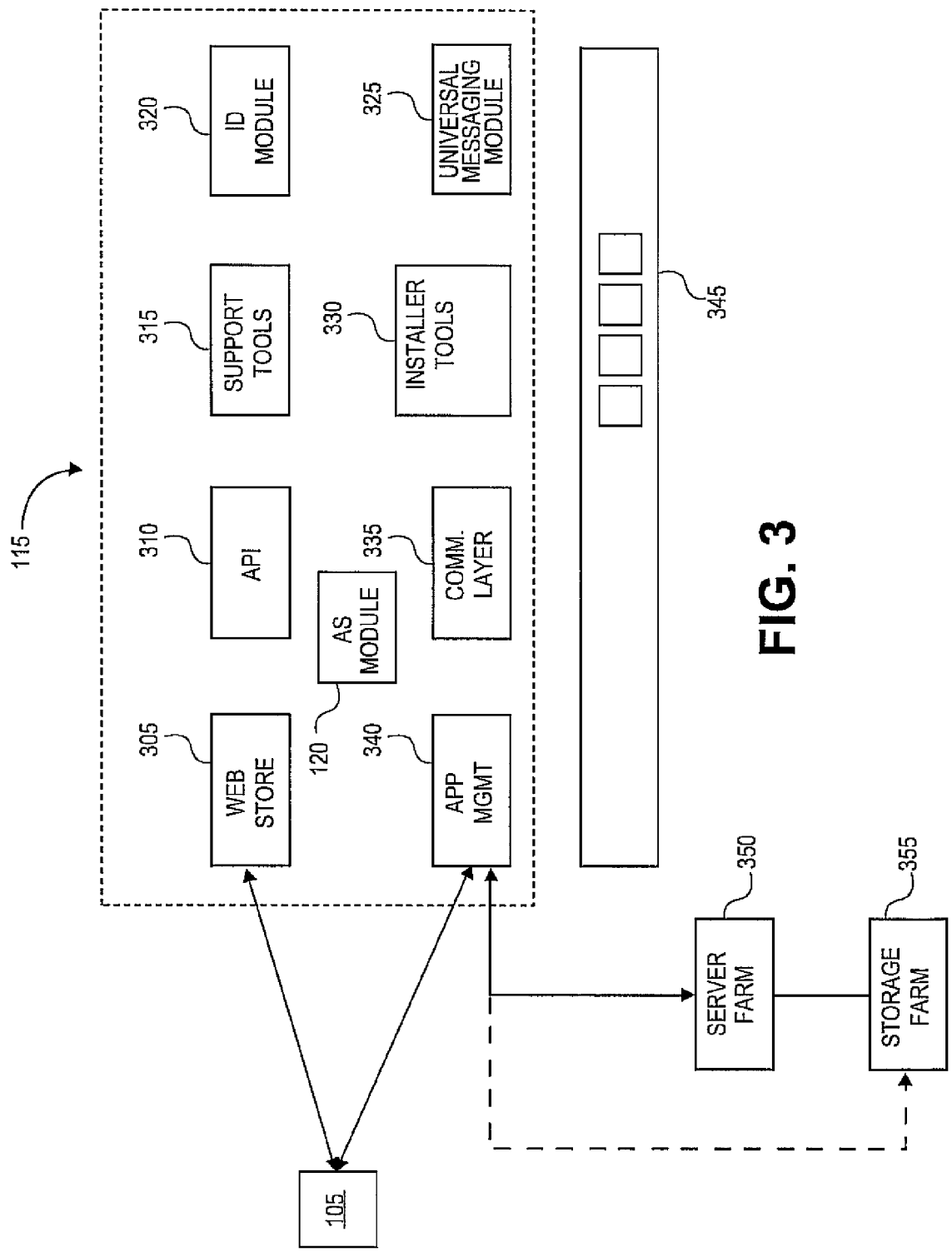
FIG. 3 illustrates an exemplary service portal of the system shown in FIG. 1 in accordance with another embodiment.

FIG. 3 illustrates a more detailed block diagram of web service portal 115 including AS module 120 in accordance with another embodiment. It should be readily apparent to those of ordinary skill in the art that web service portal 115 depicted in FIG. 3 represents a generalized schematic illustration and that other components may be added or existing components may be removed or modified.

As shown in FIG. 3, web service portal 115 can include a web store module 305 that a user can interface with the service portal. Web store module 305 can provide the graphical user interfaces ("GUIs") and associated functions and/or services for web service portal 115. As a non-limiting example, web store module 305 can generate a log-in GUI for a user to authenticate and enter web service portal 115.

Web store module 305 can couple with an application program interface ("API") module 310. API module 210 can be configured to provide an interface between the functions and/or services provided by web store module 305 and to the appropriate module of web service portal 115. More particularly, API module 310 can call or direct a requested function or service from the user to the respective module that provides that requested function or service. For example, a user may request a price of a product, e.g., product vending module, API module 310 can direct the request to a get price function in a support tools module 315. Additionally, a user may request a software appliance, API module 310 can direct the request to AS module 120.

API module 310 can also be configured to interface with support tools module 315. Support tools module 315 can be configured to provide the supporting software and hardware to implement the functionality of web service portal 115. Support tools module 315 can contain and provide access to databases that contain information such as products lines, software appliances services providers, on-line self-help (e.g., knowledgebase), etc. Support tools module 315 can also provide services like a chat services, a help desk, installation, provisioning, etc.

API module 310 can be further configured to couple with an identification ("ID") module 320. ID module 320 can be configured to provide identification management services for web service portal 115. ID module 320 can also store information related to users such as purchase history, user profile, usage history of the user, and entitlement data.

API module 310 can be further configured to couple with a universal messaging module 325. Universal messaging module 325 can be configured to provide a messaging application that unifies messages. More specifically, electronic mail ("email"), documents, and instant messaging can be linked in a single application. Universal messaging module 325 can also provide a mechanism for a user to view all the related documents for the user from email to Wiki pages.

An installer tools 330 can be coupled to API module 310. One of the services provided by web service portal 115 can be the purchase of software applications and software appliances provided by independent software vendors ("ISVs"). As part of the delivery of the software applications and appliances, the ISV can be required to maintain and update the installation tools to install their respective software applications and appliances. Accordingly, installer tools 330 can be a repository where independent software vendors can deposit their respective installation tools.

API module 310 can be further coupled to a communication layer 335 (labeled as COMM layer in FIG. 3). Communication layer 335 can be configured to provide the underlying services for the modules of web service portal 115 to communicate. For example, communication layer 335 can contain middleware for a product database to communicate with a graphical user interface requesting product description.

API module 310 can be further coupled to an application management module 340 (labeled as APP MGMT in FIG. 3). Application management module 340 can be configured to manage applications as requested by users. More specifically, a user may purchase a prepackaged software application pack (e.g., an operating system, electronic mail program and data mining program) from web service portal 115, which is stored in an application stack module 345. Application management module 340 can then deliver the purchased software stack, install and configure the software application stack at a third party site such as server farm 350 or store the software application stack in a storage farm 355 for the user to retrieve.

Server farm 350 can be configured to provide computing platforms for users to lease. Accordingly, users can have a backup version of their systems, a testing platform to perform quality assurance tests on new applications or new software appliances, execute a program requiring excessive MIPS, or any other similar computing task. Additionally, server farm 350 can be configured to store software appliances for download by users 105.

Storage farm 355 can be configured to provide storage space for users to lease. Accordingly, users can lease disk storage space to back up data, provide a hot data swap, or other storage intensive tasks. Additionally, storage farm 355 can be configured to store software appliances for download by users 105.

In some embodiments, AS module 120 can be configured to be executed in one of the other components (not shown). As illustrated, in other embodiments, CS module 120 can be executed as a standalone module.

Figure 4:
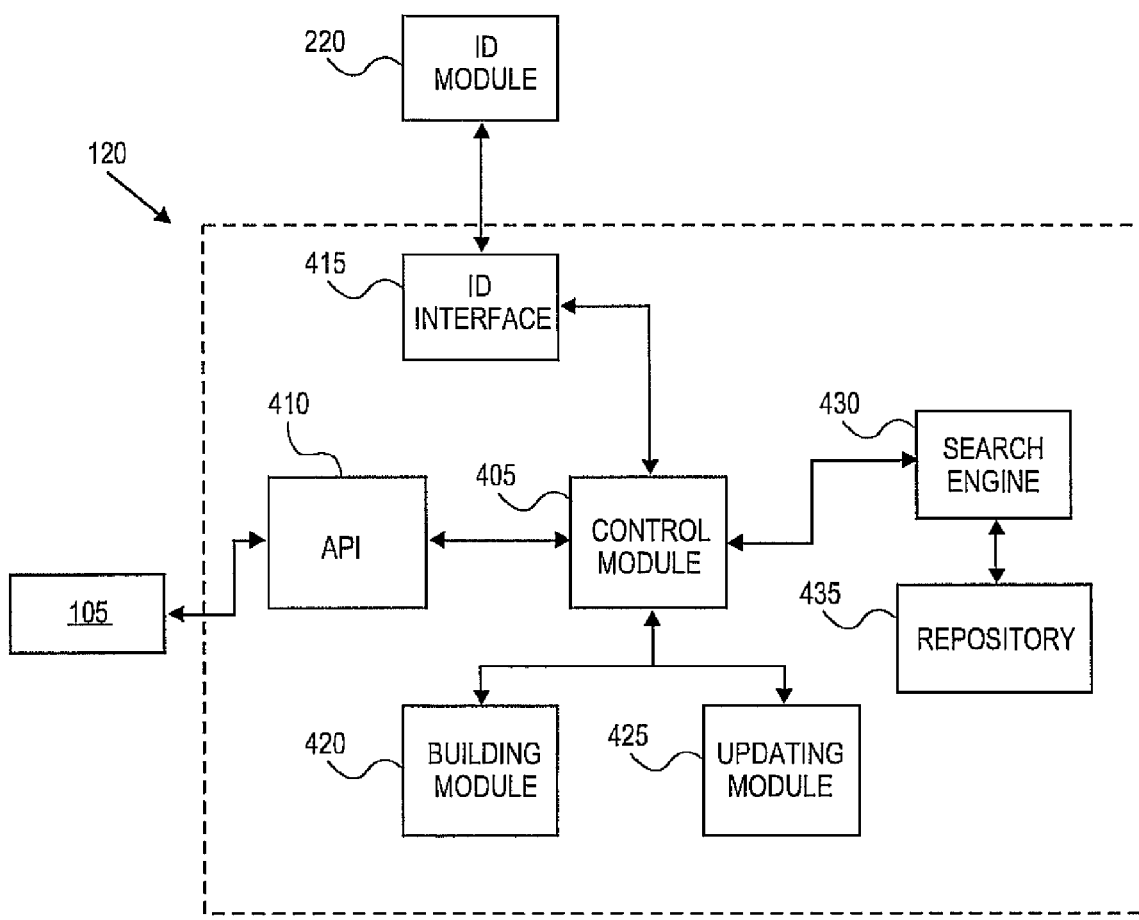
FIG. 4 depicts an exemplary AS module shown in FIG. 1 in accordance with yet another embodiment.

FIG. 4 depicts a more detailed block diagram of AS module 120 in accordance with another embodiment. It should be readily apparent to those of ordinary skill in the art that AS module 120 depicted in FIG. 4 represents a generalized schematic illustration and that other components may be added or existing components may be removed or modified.

As shown in FIG. 4, AS module 120 can comprise a control module 405, an application program interface ("API") 410, a identification ("ID") interface 415, a building module 420, an updating module 425, a search engine 420, and a repository 435. It should be readily obvious to one of ordinary skill in the art that the modules 405-435 can be implemented as software applications (programmed in C, C++, JAVA, PHP, etc.), hardware components (EEPROM, application specific integrated circuit, microprocessor, etc.) or combinations thereof.

Control module 405 can be configured to manage and interface with the other modules 410-435 to provide the functionality of the AS module 120 as described above and further described herein below. Additionally, control module 405 can be configured to interface with other modules such as ID module 320 via ID interface 415 as described above and further described herein below.

API 410 can be configured to generate GUIs, e.g. dialog boxes, web pages, as required by control module 405 and to provide an interface to other modules of web service portal 115. API 410 can be configured to operate in conjunction with web store 305 and API 310. For example, when a user 105 requests a software appliance related service or product in via web store 305, API 310 can pass the request to API 410. One skilled in the art will realize that API 410 is optional and that the functionality of API 410 can be performed by API 410.

Figure 5A:
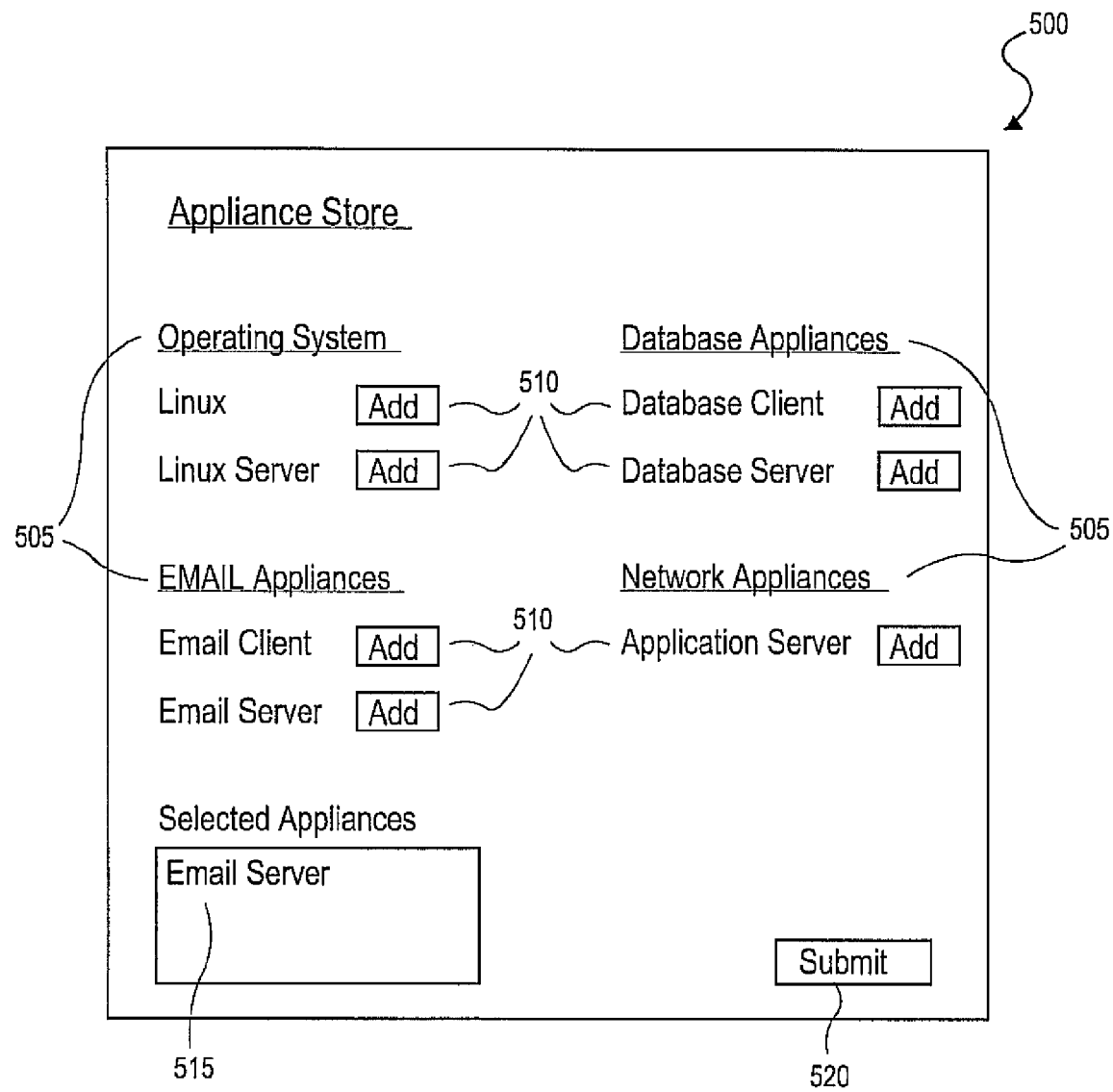
FIGS. 5A and 5B illustrate exemplary web site interfaces in accordance with yet another embodiment.

FIG. 5A shows an exemplary web page 500 generated by web store 305 to allow a user to request a role based software appliance. As show, web page 500 includes appliance categories 505, role based appliance widgets 510, selected appliances window 515, and confirmation button 520.

As shown, web page 500 is configured to display the available role based appliances based on categories 505. Role based appliances are displayed in categories 505 based on their associated roles. For example, category 505, which is labeled email appliances, can be configured to include the available Email related appliances: Email client and Email server.

Web page 500 is configured to associate with each available appliance a widget 510. Widget 510 allows the user to select the appliance requested to be provided. For example, if the user desires an Email server appliance, the user can select widget 510 associated with the Email server appliance.

Web page 500 is configured to display the appliances selected by the user in selected appliances window 515. For example, in the user selects an email server appliance, selected appliances window 515 can display "Email server" as being selected. Selected appliances window 515 can also be configured to be interactive. As such, a user can select an appliance displayed in selected appliances window 515 and remove the appliance if necessary. Once the user has made selections in web page 500, web store 305 can be configured to send the request for the selected appliances to AS module 120 upon selection of confirmation button 520.

Likewise, API 410 can be configured to operate in conjunction with other modules of web service portal 115 such as universal messaging module 325. For example, a user 105 can submit a request for a software appliance in a message, such as an email. As such, API 310 can pass the request from universal messaging module 325 to API 410.

Control module 405 can be configured to receive the user's request via API 410. According to embodiments, control module 405 can be configured to receive a request for a software appliance for a based on a role desired by the user. The role of the request is the particular usage and functionality sought by the user. For example, the user can request a software appliance specifically for an Email server.

Control module 405 can be configured to determine a software appliance based on the role requested by the user. In particular, control module 405 can be coupled to repository 435. Repository 435 can be configured to store various pre-generated software appliances based on the different roles typically requested by users. For example, repository 435 can maintain various pre-generated software appliances for roles such as Email Server appliance, application server appliance, customer relation management (CRM) appliance, enterprise resource planning (ERP) appliance, and the like. Repository 435 can be configured to store the binary image of the pre-generated appliance. Likewise, repository 435 can be configured to store recipes for the pre-generated appliances. The recipe describes the bits that make up the applications and MiniOS included in a software appliance As mentioned above in FIG. 2, the software appliance includes one or more application and MiniOS to support the applications. Likewise, each role based appliance includes the applications to accomplish the desired role and MiniOS to support the role of the application. For example, for the Email Server appliance, the appliance can include the Email Sever application and MiniOS to support the functionality of the Email Server.

Repository 435 can also be configured to store pieces of the software appliance. Repository 435 can be configured to store the bits of various applications and the bits of various MiniOS. As such, control module 435 can retrieve the bits of the applications and the bits of the MiniOS that meet the role of the request in order to build the appliance. Likewise, repository 435 can be configured to store the recipes for the various applications and various MiniOS.

Repository 435 can be implemented in any structure such as a database. For example, repository 435 can be implemented utilizing any type of conventional database architecture using open source technologies, proprietary technologies, or combinations thereof.

In order to locate and retrieve the pre-generated appliance or portions of the appliance, control module 430 can be coupled to search engine 430. Search engine 430 can be configured to allow control module 430 to search repository 435. Search engine 430 can allow control module 430 to search the repository based on the requested role of the software appliance.

Control module 405 can be configured to include ID information of the user requesting the appliance. To achieve this, control module 305 can be coupled to ID interface 415. ID interface 415 can be coupled to ID module 320 of web service portal 115. Control module 405 can utilize ID interface 415 to retrieve the ID information for the user.

In order to build the appliance, control module 405 can be coupled to building module 420. After retrieving the pre-generated appliance, the recipe of the pre-generate appliance, and/or portions of the appliance, control module 405 can be configured to pass the pre-generated appliance, the receipt, and/or portions of the appliance to building module 420. Control module 405 can be configured to pass the ID information to building module 420.

Building module 420 can be configured to build the appliance based on the role provided in the request. If building module 420 receives a pre-configured appliance, building module 420 can append the ID information of the user to the pre-configured appliance to form the complete appliance.

If building module receives a recipe, building module 420 can build the appliance based on the recipe. Building module 420 can append the ID information of the user to the pre-configured appliance to form the complete appliance.

If building module 420 receives a portions of the appliance, building module 420 can be configured to assemble the appliance from the bits of the applications and bits of the MiniOS and can be configured to append the ID information of the user to the assembled appliance. After building the appliance, building module 420 can be configured to return the complete appliance to control module 405.

Building module 420 can be configured to append a unique serial number to the software appliance. The unique serial number serves to identify a particular instance of the software appliance. The unique serial number can be used in other process performed by AS module 120 such as updating and upgrading a software appliance.

According to various embodiments, the role based appliance created by AS module 120 is static in relation to its role. That is, the appliance is created to serve only the requested role. As such, the role based appliance cannot be upgraded to include additional functionality. The role based appliance can be configured to be updated. That is, once new versions of the applications and MiniOS contained in the role based appliance are produced, the role based appliance can be updated to reflect the new version of the contained applications and MiniOS. For example, if the MiniOS contained in various role based appliances is updated to correct an bug or the like, the role based appliances can be updated to reflect the new version of the MiniOS.

Once the role based appliance has been determined, control module 405 can pass the appliance to API 410. API 410 can be configured to provide the appliance to the user. API 410 can be configured to pass the complete appliance to universal messing module 305 in order to be transmitted to the user. For example, universal messaging module 305 can transmit the complete appliance to the user in an email message.

Additionally, API 410 can place the complete appliance on server farm 350 or storage farm 355 for downloading at a late time. As such, API 410 can instruct universal messaging module to transmit a link to the user to allow the user to download the complete appliance. Also, API can be configured to instruct web store 305 to provide the link in a web page.

Figure 5B:
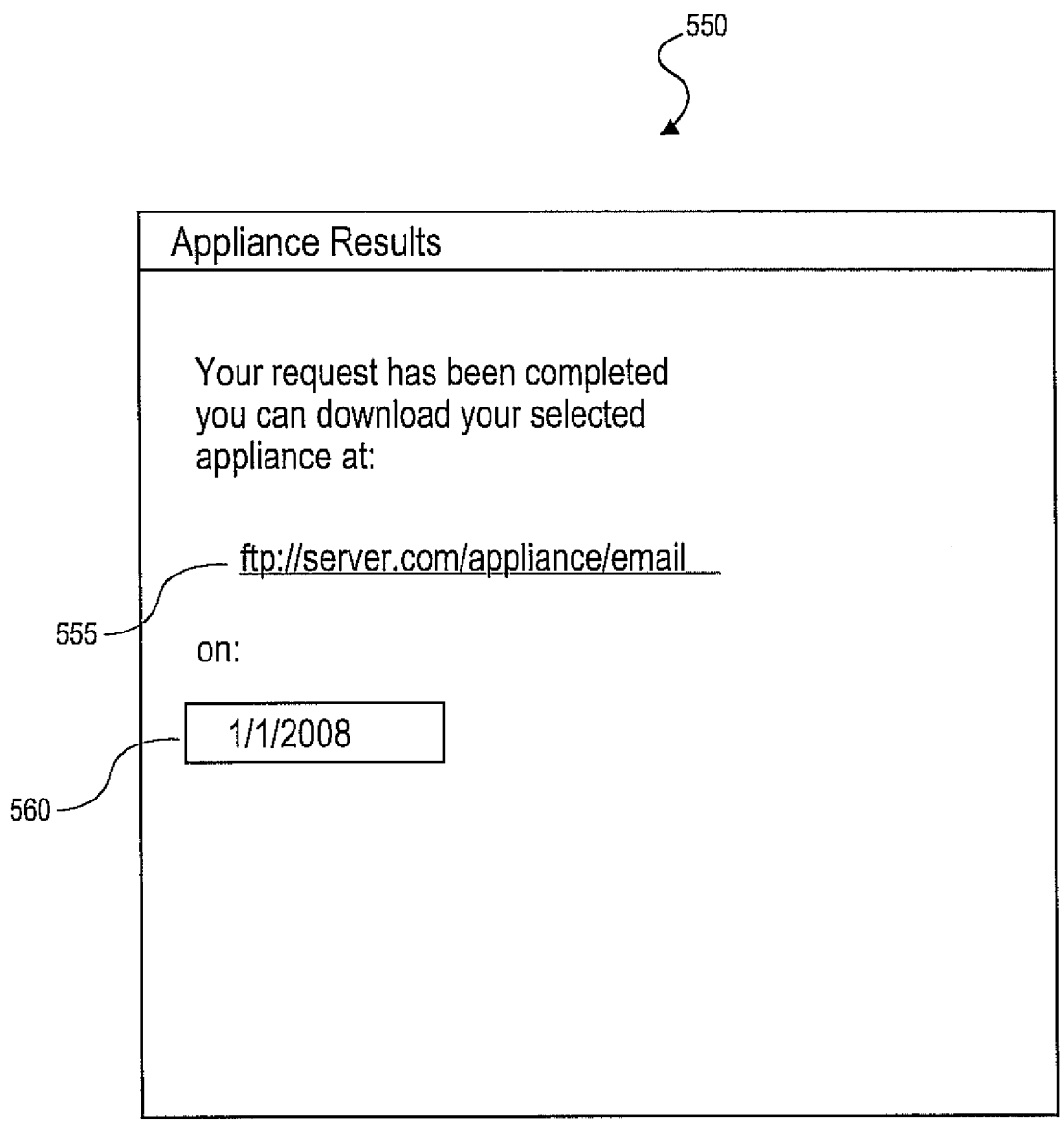

FIG. 5B shows an exemplary web page 550 for providing the link to the user. As shown, web page 550 includes the a link 555 and an availability date field 560. Link 555 is configured to allow the user to download the complete appliance from server farm 350 or storage farm 355. For example, by activating the link, the user's browser program can be configured to initiate a download process. Web page 550 can also be configured to include an availability date field 560. Field 560 is configured to display a date the complete appliance will be ready for download. For example, field 560 can display a date in the future or "immediately" if the complete appliance is ready for download.

AS module 120 can be configured to maintain a record of appliance downloaded by users. In particular, control module 405 can be configured to generate a record of appliances provided users. The record can include the user ID information associated with all appliances provided to the user. The records can also include the specific role of each appliance and record of the image of the software appliance. The records can also include the serial number of the software appliance.

AS module 120 can also be configured to update and upgrade previously provided appliances. To achieve this, control module 405 can be couple to updating module 425. Updating module 405 can be configured to update and upgrade software appliances by several different processes.

Since a software appliance is a binary image, updating module 405 can be configured to updated or upgrade a software appliance by creating a completely new binary image of the entire software appliance incorporating the updates or upgrades. To update or upgrade the software appliance using a complete image, updating module 425 can be configured to create the updated or upgraded appliance. AS module 120 can be configured to provide the updated or upgraded appliance to the user to simply replace the existing software appliance.

Alternatively, updating module 425 can be configured to update or upgrade a software appliance incrementally. For each update or upgrade, updating module 425 can be configured to determine the bits of the binary image required to update or upgrade a software appliance. AS module 120 can be configured to provide the update or upgrade bits to the user. To update or upgrade the software appliance, the user can add the update or upgrade bits to the software appliance on a binary-difference basis.

Since a role based software appliance is static with regards it role, AS module 120 can update the role based software appliance utilizing either method described above.

Figure 6:
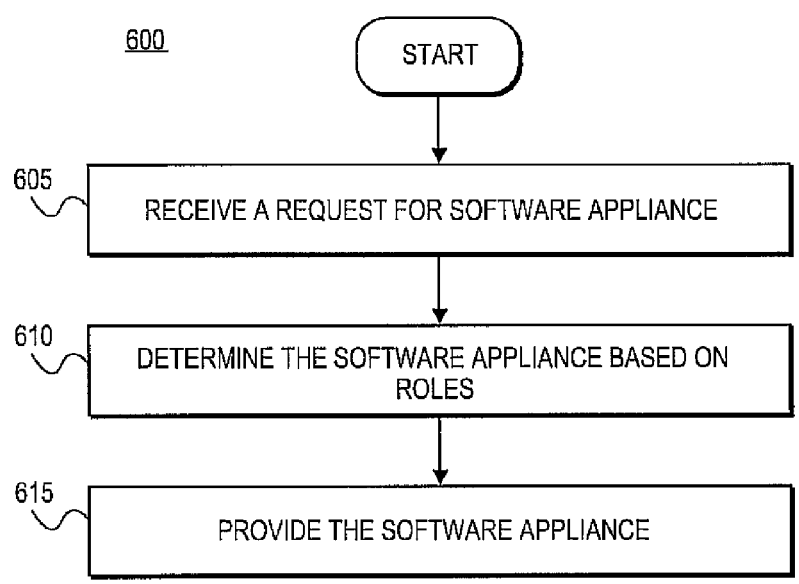
FIG. 6 depicts an exemplary flow diagram in accordance with yet another embodiment.

FIG. 6 illustrates a flow diagram 600 for providing a software appliance from AS module 120 in accordance with various embodiments. It should be readily apparent to those of ordinary skill in the art that the flow diagram 600 depicted in FIG. 6 represents a generalized schematic illustration and that other steps may be added or existing steps may be removed or modified.

As shown in FIG. 6, AS module 120 can be configured to receive a request for a software appliance based on a role, step 605. The role can be the desired usage and function of the software appliance.

In response, in step 610, AS module 120 can determine a software appliance that meets the requested role. AS module 120 can determine the software appliance by locating or creating an appliance with applications that meet the requested role and MiniOS to support the applications.

In step 615, AS module 120 can provide the role based appliance to the requesting user. For example, AS module 120 can deliver the software appliance via physical media or transmit the software appliance to the user via a network. Likewise, AS module 120 can provide the user with a link to the software appliance to allow the user to download the software appliance.

Figure 7:
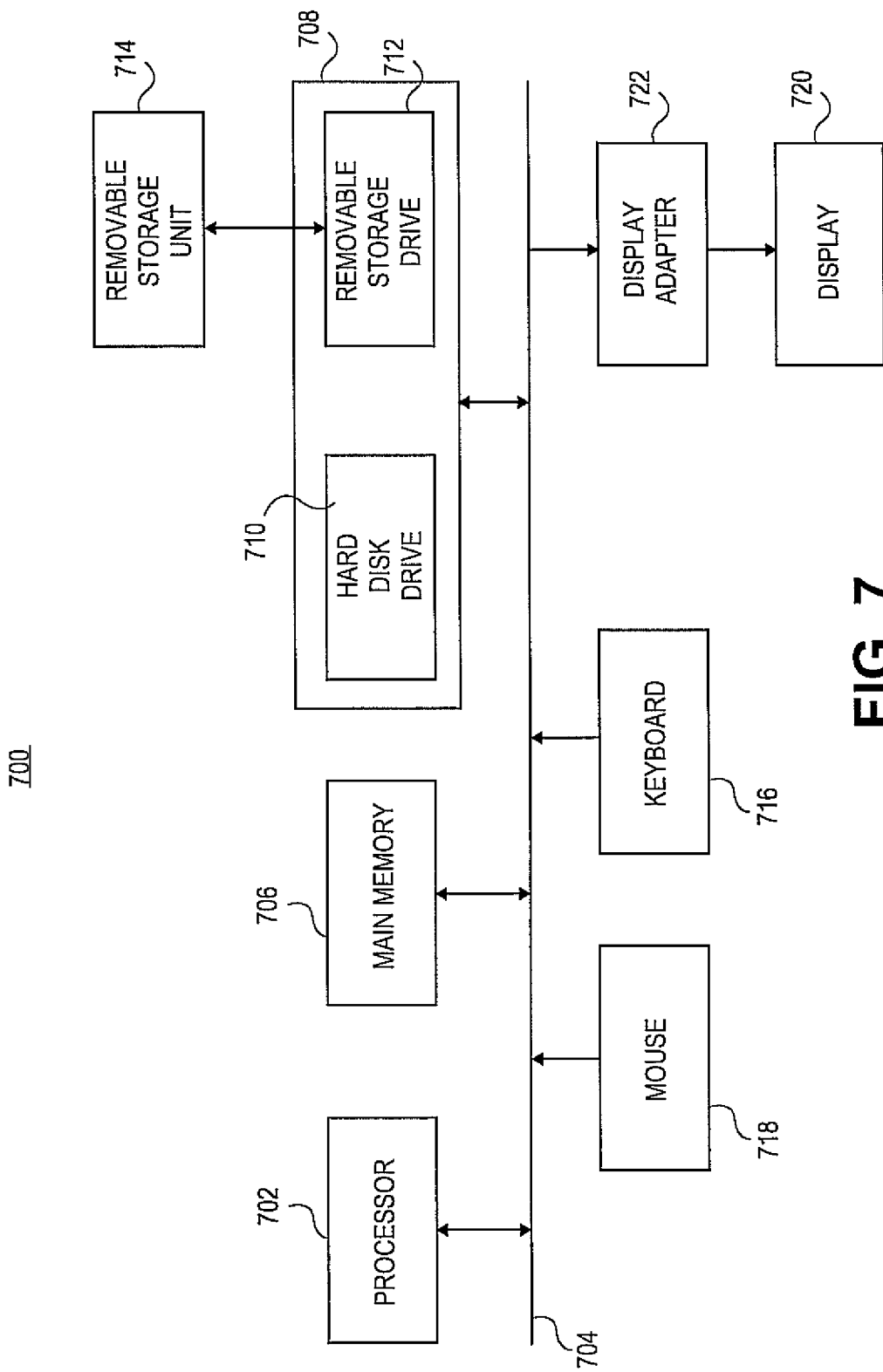
FIG. 7 depicts an exemplary computing platform in accordance with yet another embodiment.

FIG. 7 illustrates an exemplary block diagram of a computing platform 700 where an embodiment may be practiced. The functions of the AS module 120 can be implemented in program code and executed by computing platform 700. AS module 120 may be implemented in computer languages such as PASCAL, C, C++, JAVA, etc.

As shown in FIG. 7, computing platform 700 includes one or more processors, such as processor 702 that provide an execution platform for embodiments of AS module 120. Commands and data from processor 702 are communicated over a communication bus 704. Computing platform 700 also includes a main memory 706, such as a Random Access Memory (RAM), where AS module 120 can be executed during runtime, and a secondary memory 708. Secondary memory 708 includes, for example, a hard disk drive 710 and/or a removable storage drive 712, representing a floppy diskette drive, a magnetic tape drive, a compact disk drive, etc., where a copy of a computer program embodiment for AS module 120 can be stored. Removable storage drive 712 reads from and/or writes to a removable storage unit 714 in a well-known manner. A user interfaces with the AS module 120 with a keyboard 716, a mouse 718, and a display 720. Display adapter 722 interfaces with the communication bus 704 and display 720. Display adapter 722 also receives display data from processor 702 and converts the display data into display commands for display 720.

Additionally, software appliances including management tools, such as software appliance 200, can be implemented on an exemplary computing platform 700. For example, processor 702 can provide an execution platform for embodiments of the software appliance. The software appliance can be executed during runtime on main memory 706. The binary image of the software appliance can be stored in secondary memory 708.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
   storing recipes in a repository, wherein each of the recipes describe the bits that make up applications and the minimum operating system included in a software appliance;
   receiving, by a processor, a request describing a role, the request comprising a unique user identifier;
   identifying, by the processor, a first software appliance that comprises an application to perform the role and a minimum operating system for the application;
   building the first software appliance by retrieving, based on a first recipe for the first software appliance, bits of the applications and the bits of the minimum operating system for the first software appliance;
   appending the unique user identification and a unique serial number to the first software appliance;
   storing the unique user identification and the unique serial number associated with the first software appliance;
   determining update bits of a binary image to update the first software appliance;
   adding the update bits of the binary image to the first software appliance;
   identifying an instance of the first software appliance in view of the stored unique serial number and the stored unique user identification;
   providing the identified instance of the first software appliance to a system associated with the unique user identification; and
   updating the identified instance of the first software appliance in view of the stored unique serial number and the stored unique user identification.

2. The method of claim 1, wherein identifying the software appliance comprises:
   locating a software appliance in a repository, the software appliance comprising the application capable of performing the role and the minimum operating system to provide an execution platform for the application capable of performing the role.

3. The method of claim 2, wherein identifying the software appliance comprises:
   locating the application capable of performing the role in a repository;
   locating a portion of an operating system to provide the execution platform for the application in the repository; and
   combining the located application and the located portion of the operating system to form the software appliance.

4. The method of claim 2, wherein the software appliance is a binary image of data embodying the software appliance.

5. The method of claim 4, wherein providing the software appliance comprises:
   storing the binary image in a repository; and
   providing a link to a location of the binary image in the repository.

6. The method of claim 4, wherein providing the software appliance comprises transmitting the binary image to the system associated with the user initiating of the request.

7. The method of claim 4, wherein providing the software appliance comprises storing the binary image on a computer readable medium.

8. An apparatus comprising:
   a memory;
   a processor coupled to the memory;
   a repository to store recipes, wherein each of the recipes describe the bits that make up applications and the minimum operating system included in a software appliance;
   a program interface executable from the memory by the processor and receives a request describing a role, the request comprising a unique user identifier;
   the repository to store a first software appliance that comprises an application to perform the role and a minimum operating system for the application; and
   a control module executable from the memory by the processor and coupled to the program interface and the repository, the control module to:
   build the first software appliance by retrieving, based on a first recipe for the first software appliance, bits of the applications and the bits of the minimum operating system for the first software appliance;
   append the unique user identification and a unique serial number to the first software appliance;
   store the unique user identification and the unique serial number associated with the first software appliance;
   determine update bits of a binary image to update the first software appliance;
   add the update bits of the binary image to the first software appliance;
   identify an instance of the first software appliance in view of the stored unique serial number and the stored unique user identification;
   provide the identified instance of the first software appliance to a system associated with the unique user identification; and
   update the identified instance of the first software appliance in view of the stored unique serial number and the stored unique user identification.

9. The apparatus of claim 8, wherein the control module to retrieve identifying information of the user initiating the request.

10. The apparatus of claim 9, further comprising:
    a building module executable from the memory by the processor and coupled to the control module, the building module to build the software appliance comprising the application to perform the role and the minimum operating system to provide an execution platform for the application.

11. The apparatus of claim 8, wherein the program interface provides a link to a location of a binary image of data embodying the software appliance in a repository.

12. The apparatus of claim 8, wherein the program interface transmits a binary image of data embodying the software appliance to the system associated with the user initiating the request.

13. A system comprising:
    a memory;
    a processor coupled to the memory;
    and a web service portal executable from the memory by the processor;

a repository to store recipes, wherein each of the recipes describe the bits that make up applications and the minimum operating system included in a software appliance;

a program interface executable from the memory by the processor and coupled to the web service portal to receive a request describing a role, the request comprising a unique user identifier;

the repository coupled to the web service portal to store a first software appliance that comprises an application to perform the role and a minimum operating system for the application; and a control module executable from the memory by the processor and coupled to the web service portal, the program interface and the repository, the control module to:

build the first software appliance by retrieving, based on a first recipe for the first software appliance, bits of the applications and the bits of the minimum operating system for the first software appliance;

append the unique user identification and a unique serial number to the first software appliance;

store the unique user identification and the unique serial number associated with the first software appliance;

determine update bits of a binary image to update the first software appliance;

add the update bits of the binary image to the first software appliance;

identify an instance of the first software appliance in view of the stored unique serial number and the stored unique user identification;

provide the identified instance of the first software appliance to a system associated with the unique user identification; and update the identified instance of the first software appliance in view of the stored unique serial number and the stored unique user identification.

14. The system of claim 13, wherein the control module to retrieve identifying information of the user initiating the request.

15. The system of claim 14, further comprising:

a building module executable from the memory by the processor and coupled to the control module, the building module to build the software appliance that comprises the application to perform the role and the minimum operating system to provide an execution platform for the application, wherein the building module to append the identifying information of the user initiating the request to a software appliance.

16. The system of claim 13, the program interface to provide a link to a location of a binary image of data embodying the software appliance in a repository.

17. The system of claim 13, the program interface to transmit a binary image of data embodying the software appliance to a system initiating the request.

18. A non-transitory computer-readable storage medium including instructions that, when executed by a processor, cause the processor to execute operations comprising:

storing recipes in a repository, wherein each of the recipes describe the bits that make up applications and the minimum operating system included in a software appliance;

receiving, by a processor, a request describing a role, the request comprising a unique user identifier;

identifying, by the processor, a first software appliance that comprises an application to perform the role and a minimum operating system for the application;

building the first software appliance by retrieving, based on a first recipe for the first software appliance, bits of the applications and the bits of the minimum operating system for the first software appliance;

appending the unique user identification and a unique serial number to the first software appliance;

storing the unique user identification and the unique serial number associated with the first software appliance;

determining update bits of a binary image to update the first software appliance;

adding the update bits of the binary image to the first software appliance;

identifying an instance of the software appliance in view of the stored unique serial number and the stored unique user identifier associated with the first software appliance;

providing the identified instance of the first software appliance to a system associated with the unique user identification; and updating the identified instance of the first software appliance in view of the stored unique serial number and the stored user identifier identification.

19. The non-transitory computer-readable storage medium of claim 18, wherein identifying the software appliance comprises:

locating a software appliance in a repository, the software appliance comprising the application capable of performing the role and the minimum operating system to provide an execution platform for the application capable of performing the role.

20. The non-transitory computer-readable storage medium of claim 18, wherein identifying the software appliance comprises:

locating the application capable of performing the role in a repository;

locating a portion of an operating system to provide the execution platform for the application in the repository; and combining the located application and the located portion of the operating system to form the software appliance.

21. The method of claim 1, further comprising upgrading the software appliance by one of replacing the software appliance with a complete image or adding update bits to the software appliance on a binary-difference basis.

* * * * *